US009911194B2

(12) United States Patent
Hornung et al.

(10) Patent No.: US 9,911,194 B2
(45) Date of Patent: Mar. 6, 2018

(54) SYSTEMS AND METHODS FOR HIGHER ORDER DIMENSIONAL SPACE VIDEO SEGMENTATION

(71) Applicants: DISNEY ENTERPRISES, INC., Burbank, CA (US); ETH Zürich, Zürich (CH)

(72) Inventors: Alexander Sorkine Hornung, Zürich (CH); Federico Perazzi, Zürich (CH); Oliver Wang, Zürich (CH); Nicolas Märki, Zürich (CH)

(73) Assignees: Disney Enterprises, Inc., Burbank, CA (US); ETH Zürich, Zürich (CH)

( * ) Notice: Subject to any disclaimer, the term of this patent is extended or adjusted under 35 U.S.C. 154(b) by 72 days.

(21) Appl. No.: 15/165,056

(22) Filed: May 26, 2016

(65) Prior Publication Data

US 2017/0345151 A1    Nov. 30, 2017

(51) Int. Cl.
*G06K 9/34* (2006.01)
*G06T 7/10* (2017.01)
(Continued)

(52) U.S. Cl.
CPC ............ *G06T 7/10* (2017.01); *G11B 27/3081* (2013.01); *G11B 27/34* (2013.01);
(Continued)

(58) Field of Classification Search
CPC ............ G06T 7/10; G06T 2207/20092; G06T 2207/10016; G06T 2207/20112; G11B 27/3081; G11B 27/34
See application file for complete search history.

(56) References Cited

U.S. PATENT DOCUMENTS 8,341,152 B1 * 12/2012 Bates .................. G06F 17/3079
707/706
8,510,795 B1 * 8/2013 Gargi ...................... G09B 5/06
382/276

(Continued)

OTHER PUBLICATIONS

Nicolas Marki et al., "Bilateral Space Video Segmentation" IEEE Conference on Computer Vision and Pattern Recognition (CVPR), 2016, pp. 743-751.*

*Primary Examiner* — Samir Ahmed
(74) *Attorney, Agent, or Firm* — Sheppard Mullin Richter & Hampton LLP (57) ABSTRACT

This disclosure relates to system and methods for segmenting a video in a higher order dimensional space. A video may be segmented by obtaining visual information defining an image of the video. The visual information may include pixels of the image and may be represented in a display space having a first dimensionality. A designation of a subset of the visual information represented in the display space as a part of an object portrayed in the image may be obtained. The visual information and the designation may be represented in the higher order dimensional space having a second dimensionality greater than the first dimensionality. An association of the visual information represented in the higher order dimensional space with the object may be obtained. The association may be correlated with the visual information represented in the display space. The correlation may define a location of the object in the image.

20 Claims, 9 Drawing Sheets

(51) Int. Cl.
*G11B 27/30* (2006.01)
*G11B 27/34* (2006.01)

(52) U.S. Cl.
CPC ............ *G06T 2207/10016* (2013.01); *G06T 2207/20092* (2013.01); *G06T 2207/20112* (2013.01)

(56) References Cited

U.S. PATENT DOCUMENTS

| | | | |
|---|---|---|---|
| 2002/0145603 A1* | 10/2002 | Iwasaki | G06K 9/6253 345/419 |
| 2008/0088627 A1* | 4/2008 | Shimizu | G06F 17/30817 345/427 |
| 2010/0050083 A1* | 2/2010 | Axen | G11B 27/031 715/726 |
| 2013/0091432 A1* | 4/2013 | Shet | G08B 13/19645 715/719 |

* cited by examiner

SYSTEMS AND METHODS FOR HIGHER ORDER DIMENSIONAL SPACE VIDEO SEGMENTATION

FIELD

This disclosure relates to systems and methods for segmenting a video in a higher order dimensional space.

BACKGROUND

An video may contain multiple objects (e.g., foreground objects, background objects, etc.). Segmenting portions of the video based on locations of objects may be time consuming and computer intensive.

SUMMARY

This disclosure relates to segmenting a video in a higher order dimensional space. A video may be segmented by obtaining visual information defining an image of the video. The visual information may include pixels of the image and may be represented in a display space. The display space may have a first dimensionality such that the visual information represented in the display space facilitates visual reproduction of the image on a display device. A designation of a subset of the visual information represented in the display space as a part of an object portrayed in the image may be obtained. The visual information and the designation may be represented in the higher order dimensional space. The higher order dimensional space may have a second dimensionality greater than the first dimensionality. An association of the visual information represented in the higher order dimensional space with the object may be obtained based on the higher order dimensional space representation of the visual information and the designation. The association may be correlated with the visual information represented in the display space. The correlation may define a location of the object in the image.

A system for segmenting a video in a higher order dimensional space may include one or more processors, and/or other components. The one or more processors may be configured to execute one or more computer program components. The computer program components may include one or more of an obtain component, a designation component, a representation component, an association component, a correlation component, and/or other components.

The obtain component may be configured to obtain visual information defining an image of the video. The visual information may include pixels of the image. The visual information may be represented in a display space having a first dimensionality such that the visual information represented in the display space facilitates visual reproduction of the image on a display device.

The designation component may be configured to obtain a designation of a subset of the visual information represented in the display space as a part an object. The object may be portrayed in the image. In some implementations, the designation of the subset of the visual information in the display space may be obtained based on a user input. In some implementations, the user input may include one or more of a mask, a user click, a user stroke, and/or other user input. In some implementations, the designation of the subset of the visual information in the display space may be obtained automatically.

The representation component may be configured to represent the visual information and the designation in the higher order dimensional space. The higher order dimensional space may have a second dimensionality greater than the first dimensionality. In some implementations, the higher-order dimensional space may include a bilateral space. The bilateral space may include a temporal dimension. In some implementations, representing the visual information and the designation in the higher order dimensional space may include embedding the pixels of the image in the higher order dimensional space, resampling the higher order dimensional space using a regular grid, and determining values on vertices of the regular grid based on the pixels. In some implementations, the determination of the values on the vertices of the regular grid based on the pixels may include one or more of an adjacent interpolation, a nearest neighbor interpolation, a multi-linear interpolation, and/or other interpolations.

The association component may be configured to determine an association of the visual information represented in the higher order dimensional space with the object. The association may be determined based on the higher order dimensional space representation of the visual information and the designation. In some implementations, the determination of the association of the visual information represented in the higher order dimensional space with the object may include assigning a label to individual vertices of the regular grid. The label may indicate an association of the individual vertices with the object.

The correlation component may be configured to correlate the association with the visual information represented in the display space. The correlation may define a location of the object in the image. In some implementations, the correlation of the association with the visual information represented in the display space may include interpolating the labels of the individual vertices at the positions of the pixels corresponding to the individual vertices. In some implementations, the determination of the values on the vertices of the regular grid based on the pixels may include a first interpolation, and the correlation of the association with the visual information represented in the display space may include a second interpolation. The first interpolation may differ from the second interpolation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
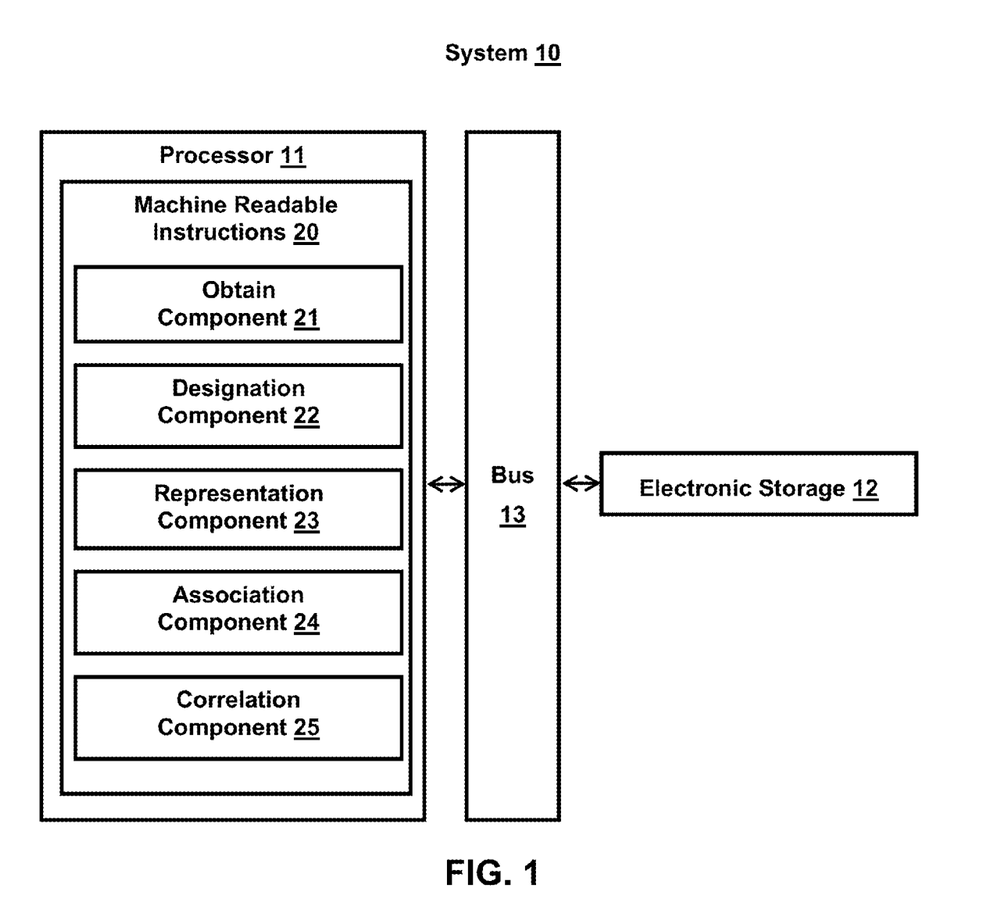
FIG. 1 illustrates a system for segmenting a video in a higher order dimensional space.

FIG. 1 illustrates a system 10 for segmenting a video in a higher order dimensional space. System 10 may include one or more of processor 11, electronic storage 12, bus 13, and/or other components. To segment a video in a higher order dimensional space, visual information defining an image of the video may be obtained. The visual information may include pixels of the image and may be represented in a display space. The display space may have a first dimensionality such that the visual information represented in the display space facilitates visual reproduction of the image on a display device. A designation of a subset of the visual information represented in the display space as a part of an object portrayed in the image may be obtained. The visual information and the designation may be represented in the higher order dimensional space. The higher order dimensional space may have a second dimensionality greater than the first dimensionality. An association of the visual information represented in the higher order dimensional space with the object may be obtained based on the higher order dimensional space representation of the visual information and the designation. The association may be correlated with the visual information represented in the display space. The correlation may define a location of the object in the image.

Electronic storage 12 may include electronic storage media that electronically stores information. Electronic storage 12 may store software algorithms, information determined by processor 11, information received remotely, and/or other information that enables system 10 to function properly. For example, electronic storage 12 may store visual information (as discussed elsewhere herein), information relating to one or more computer components, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 20 to facilitate segmenting a video in a higher order dimensional space. Machine readable instructions 20 may include one or more of obtain component 21, designation component 22, representation component 23, association component 24, correlation component 25, and/or other components.

Obtain component 21 may be configured to obtain visual information defining an image of the video. An image of a video may include one or more frames of a video. A frame of a video may include one or more of a key frame (I-frame), a predicted frame (P-frame), a bi-directional predicted frame (B-frame), and/or other frames. A frame of a video may define one or more of visuals within the video at a time, over a period of time, at a location, or over a range of locations. The visual information may include pixels of the image. Individual pixels of the image may be defined by one or more characteristics. A characteristic of a pixel may include hue, saturation, intensity, and/or other characteristics. The visual information may be represented in a display space having a first dimensionality such that the visual information represented in the display space facilitates visual reproduction of the image on a display device. For example, an image may be part of a video formatted for playback on a display device.

Figure 3:
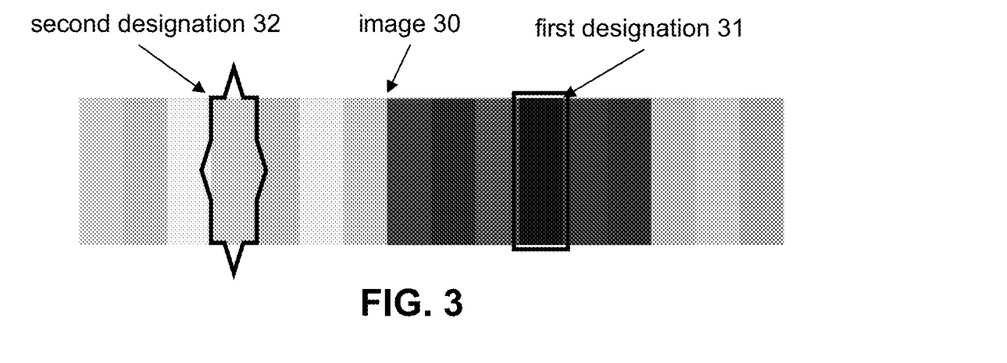
FIG. 3 illustrates an example of a one-dimensional image.

FIG. 3 illustrates image 30, a non-limiting example of an image of a video. Image 30 may include a one-dimensional image including sixteen greyscale pixels, arranged across a horizontal dimension. The intensity of sixteen greyscale pixels in image 30 may vary over the horizontal dimension. Other types of images are contemplated.

Designation component 22 may be configured to obtain a designation of a subset of the visual information represented in the display space as a part an object. The object may be portrayed in the image. For example, designation component 22 may obtain a first designation of a subset of the visual information represented in display space as part of a foreground object in image 30. Referring to FIG. 3, the sixth block from the right may be designated with first designation 31 as part of a foreground object. As another example, designation component 22 may obtain a second designation of a subset of the visual information represented in display space as part of a background object in image 30. Referring to FIG. 3, the fourth block from the left may be designated with second designation 32 as part of a background object. Other types of designation are contemplated.

In some implementations, the designation of the subset of the visual information in the display space may be obtained based on a user input. An input device may refer to a device that allows a user to input information. For example, an input device may include a key entry device, a touch entry device, a point entry device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard/button coupled to processor 11. As another example, a key entry device may include a mobile device coupled to processor 11. A user may provide one or more user inputs by typing one or more information. For example, a user may provide one or more user inputs by typing one or more information regarding designation of a subset of the visual information represented in the display space as a part an object.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more information regarding designation of a subset of the visual information represented in the display space as a part an object.

A point entry device may include a device that allows a user to provide user inputs by pointing to one or more locations. A point entry device may include a separate device or a part of another device. For example, a point entry device may include a mouse coupled to processor 11. A user may provide one or more user inputs by pointing a cursor controlled by the point entry device to one or more locations in an image. For example, a user may provide one or more user inputs by pointing to one or more locations in an image and clicking on the one or more locations to designate a subset of the visual information represented in the display space as a part an object.

User inputs may be received through an interactive interface. The interactive interface may allow a user to designate a subset of visual information in the display space while a video is playing. In some implementations, the user input may include one or more of a mask, a user click, a user stroke, and/or other user input received through an input device. A mask may refer to a grouping of pixels defining an area within an image. A user click may refer to a point in an image as indicated by a user. A user stroke may refer to a grouping of pixels defining a line within an image as indicated by a user. Other designation of the subset of visual information based on user input are contemplated.

Figure 10A:
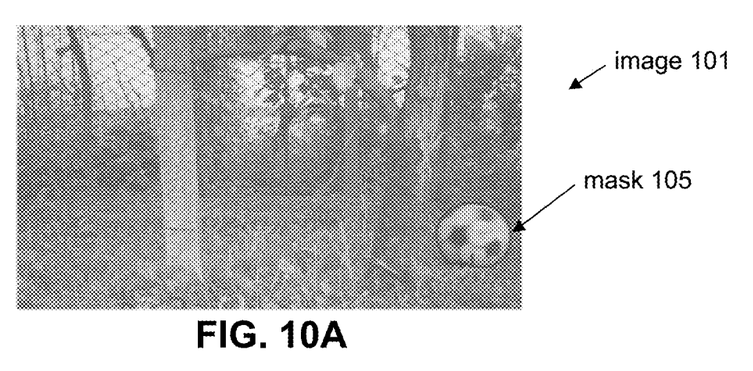
FIGS. 10A-10C illustrate examples of a user provided mask propagated through images of a video.
Figure 10B:
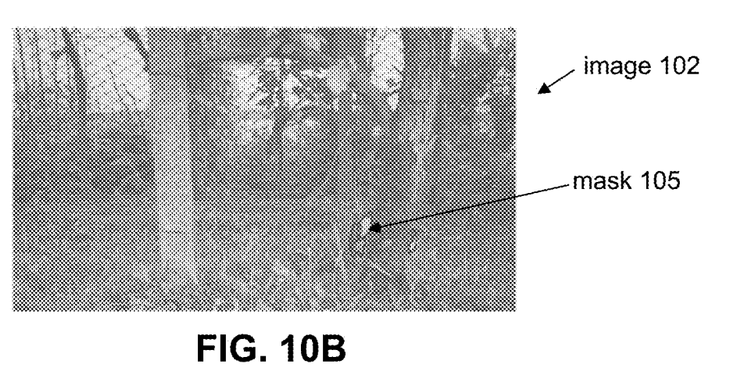
Figure 10C:
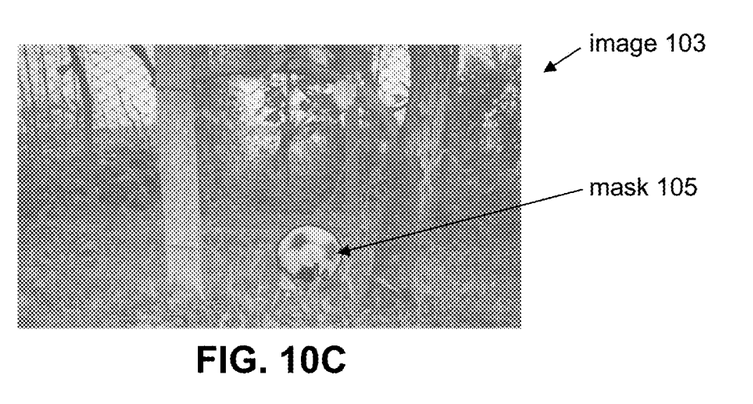

For example, FIGS. 10A-10C illustrate examples of a video segmentation based on a user provided mask. A user provided mask may be propagated through images of the video. FIGS. 10A-10C shows three images 101-103 of a video. Images 101-103 may contain a soccer ball rolling from right to left in a background area with plants and trees. In FIG. 10A, designation component 22 may obtain mask 105. Mask 105 may define an area corresponding to the soccer ball within image 101. Using the methods and/or systems described herein, portions of images 102-103 corresponding to the soccer ball may be segmented from portions of images 102-103 corresponding to the background. In FIG. 10B, the soccer ball may have rolled behind a tree and plants and mask 105 may be propagated to cover the area of image 102 corresponding to portions of the soccer ball not hidden by the tree and plants. In FIG. 10C, the soccer ball may have rolled past the tree and mask 105 may be propagated to cover the area of image 103 corresponding to portions of the soccer ball not hidden by plants.

Figure 11A:
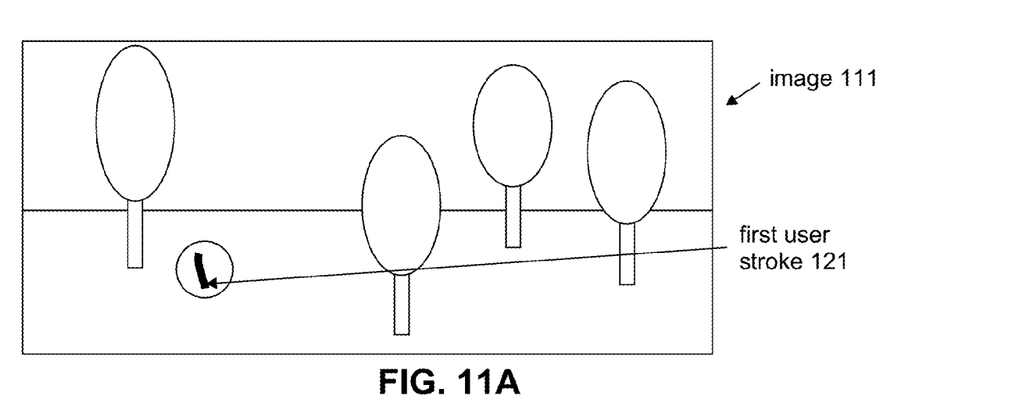
FIGS. 11A-11C illustrate examples of a video segmentation based on user strokes.
Figure 11B:
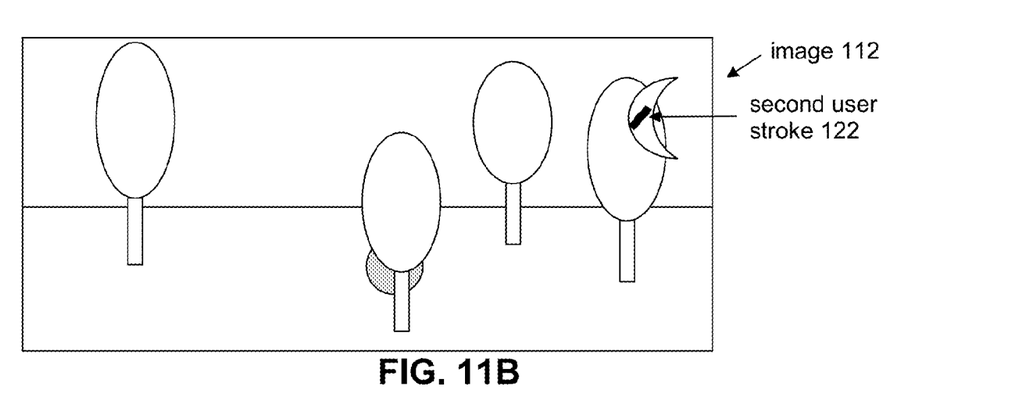
Figure 11C:
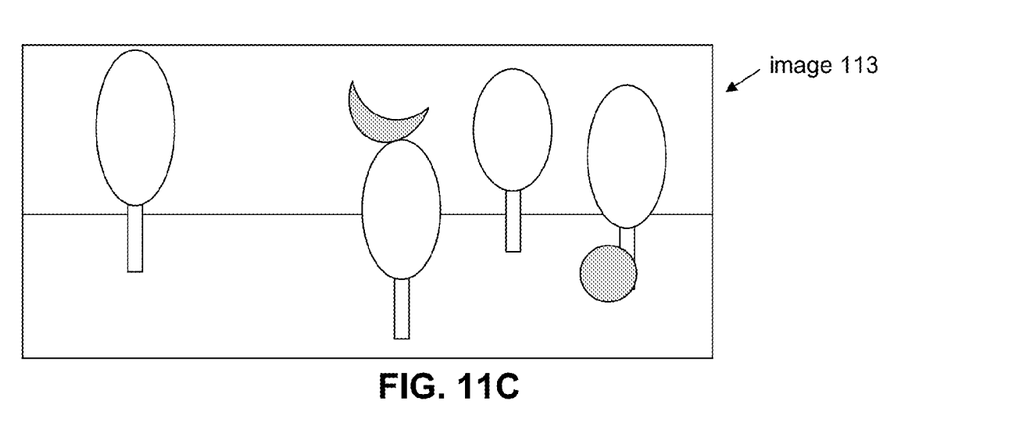

As another example, FIGS. 11A-11C illustrate examples of a video segmentation based on user strokes. FIGS. 11A-11C shows three images 111-113 of a video. Images 111-113 may contain a soccer ball rolling from left to right and a boomerang flying from right to left in a background area with trees.

In FIG. 11A, designation component 22 may obtain first user stroke 121. First user stroke 121 may designate a subset of image 111 as a part of the soccer ball. Using the methods and/or systems described herein, portions of images 112-113 corresponding to the soccer ball may be segmented from portions of images 112-113 corresponding to the background.

In FIG. 11B, the soccer ball has rolled behind a tree and the area of image 112 corresponding to portions of the soccer ball not hidden by the tree may be segmented from the area of image 112 corresponding to the background. In FIG. 11C, the soccer ball may have rolled past the tree and the area of image 113 corresponding to the soccer ball may be segmented from the area of image 113 corresponding to the background.

In FIG. 11B, designation component 22 may obtain second user stroke 122. Second user stroke 122 may designate a subset of image 112 as a part of the boomerang. Using the methods and/or systems described herein, portions of image 113 corresponding to the boomerang may be segmented from portions of image 113 corresponding to the background. In FIG. 11C, the boomerang may have flown to the left and the area of image 113 corresponding to the boomerang may be segmented from the area of image 113 corresponding to the background.

In some implementations, the designation of the subset of the visual information in the display space may be obtained automatically. The designation of the subset of the visual information may be obtained automatically by hypothesizing object location(s). Object location(s) may be hypothesized based on one or more features such as clustering of point trajectories, motion characteristics, appearance, and/or occlusion cues. In some implementations, one or more hypotheses may be diffused on a non-local graph. Other automatic designations of the subset of visual information are contemplated.

Representation component 23 may be configured to represent the visual information and the designation in a higher order dimensional space. The higher order dimensional space may have a second dimensionality greater than the first dimensionality. In some implementations, the higher-order dimensional space may include a bilateral space. A bilateral space may include a temporal dimension. In a bilateral space, Euclidean distance may similarly encode both spatial proximity and appearance.

Representing the visual information and the designation in the higher order dimensional space may include embedding the pixels of the image in the higher order dimensional space. Such operation may be referred to as lifting. As a non-limiting example, pixels ($p=[x, y, t]^T$) may be embedded in the higher order dimensional space by concatenating YUV pixel color and spatial and temporal coordinates:

$$b(p)=[c_y, c_u, c_v, x, y, t]^T \epsilon R^6$$

Figure 4:
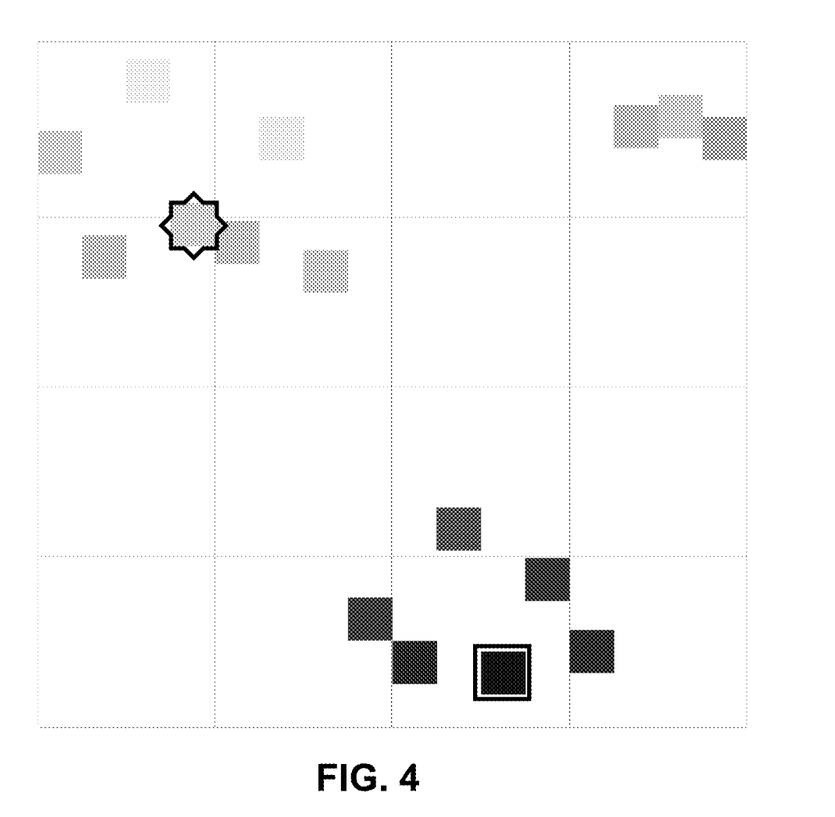
FIG. 4 illustrates an example of a one-dimensional image lifted into a two-dimensional feature space.

FIG. 4 illustrates an example of a one-dimensional image and two designations (shown in FIG. 3) lifted into a two-dimensional feature space. In FIG. 4, the horizontal positions of the sixteen greyscale pixels in FIG. 3 may be maintained in the two-dimensional feature space. The vertical positions of the pixels may be based on pixel intensity, with lower intensity corresponding to higher vertical position and higher intensity corresponding to lower vertical position.

Representing the visual information and the designation in the higher order dimensional space may include resampling the higher order dimensional space using a regular grid and determining values on vertices of the regular grid based on the pixels. A regular grid may include a bilateral grid and/or other regular grids. A bilateral grid may include an array that combines the one/two-dimensional spatial domain with a one-dimensional range dimension. The one-dimensional range dimension may include image intensity. For a two-dimensional image, a bilateral grid may include a three-dimensional array. The first two dimensions (e.g., x, y)

of the bilateral grid may correspond to two-dimensional position in the image plane and form the spatial domain. The third dimension (e.g., z) may correspond to a reference range. The reference range may include image intensity.

Values on vertices of the regular grid may be determined based on a weight function. A weight function may determine the range and influence that each lifted pixel may have on the vertices. For example, a weight sum of lifted pixels b(p) may be computed as:

$S(v) = \Sigma w(v, b(p)) \cdot (\hat{p})$, where $\hat{p} = (1_{FG}(p), 1_{BG}(p), 1)$, and $1_x(p)$ is an indicator function that is 1 iff p∈x.

Figure 9A:
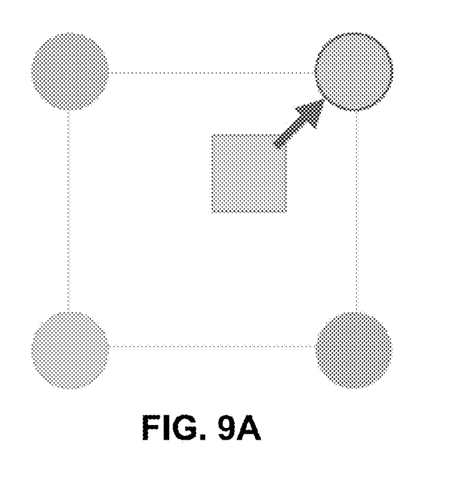
FIG. 9A illustrates an example of a nearest neighbor interpolation scheme.
Figure 9B:
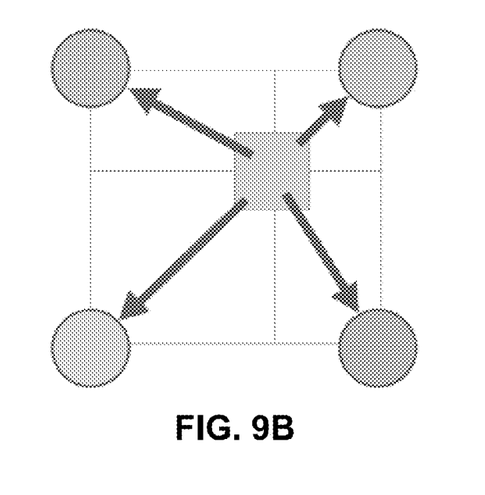
FIG. 9B illustrates an example of a multi-linear interpolation scheme.
Figure 9C:
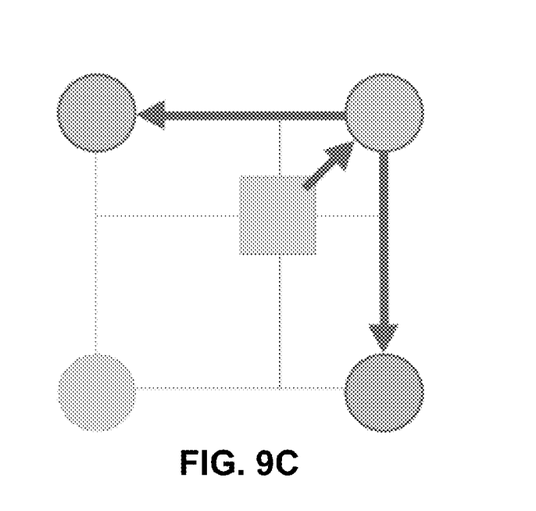
FIG. 9C illustrates an example of an adjacent interpolation scheme.

The determination of the values on the vertices of the regular grid based on the pixels may include one or more of a nearest neighbor interpolation, a multi-linear interpolation, an adjacent interpolation, and/or other interpolations. An example of a nearest neighbor interpolation is illustrated in FIG. 9A. An example of a multi-linear interpolation is illustrated in FIG. 9B. An example of an adjacent interpolation is illustrated in FIG. 9C. An adjacent interpolation may use a bound to skip weight computation where the results would have been small. Weights using an adjacent interpolation may be computed using:

$$w_a(v, b(p)) = \begin{cases} \prod_{i=1}^{d} |v_i - N_{b(p)}| & \text{if } v \in A_{b(p)} \\ 0 & \text{otherwise} \end{cases}$$

Figure 5:
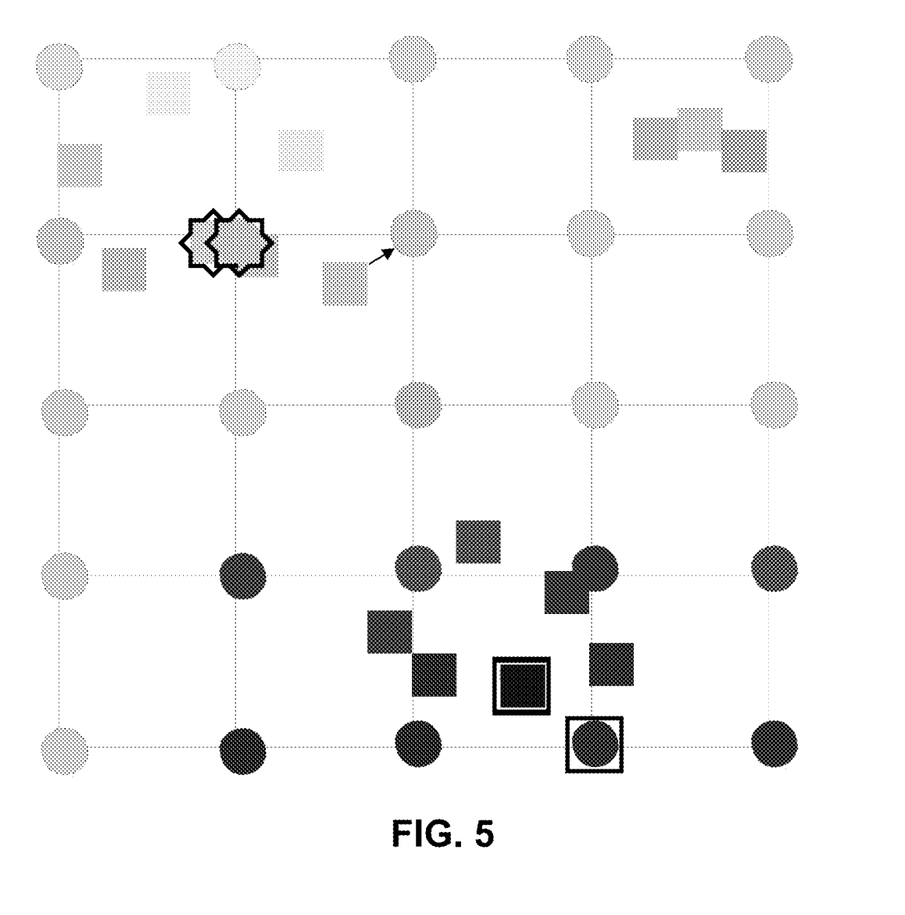
FIG. 5 illustrates an example of accumulating values on individual vertices of a two-dimensional feature space.

For example, FIG. 5 illustrates an example of accumulating values on individual vertices of a two-dimensional feature space for the one-dimensional image and two designations lifted into the two-dimensional feature space (as shown in FIG. 4). Values on the vertices of the regular grid may be calculated using an adjacent interpolation described above.

Association component 24 may be configured to determine an association of the visual information represented in the higher order dimensional space with the object. Association may be determined based on the higher order dimensional space representation of the visual information and the designation. Determination of the association of the visual information represented in the higher order dimensional space with the object may include assigning a label to individual vertices of the regular grid. The label may indicate an association of the individual vertices with the object. For example, a label may indicate individual vertices as a foreground object or a background object. Other types of objects are contemplated.

Labels for individual vertices may be determined by constructing a graph where the vertices are the vertices in the lateral grid, and edges connect immediate neighbors. An energy may be defined based on an assumption that the label assignment is smooth in bilateral space:

$$E(\alpha) = \sum_{v \in \Gamma} \theta_v(v, \alpha_v) + \lambda \sum_{(u,v) \in E} \theta_{uv}(u, \alpha_u, v, \alpha_v), \text{ where}$$

Figure 6:
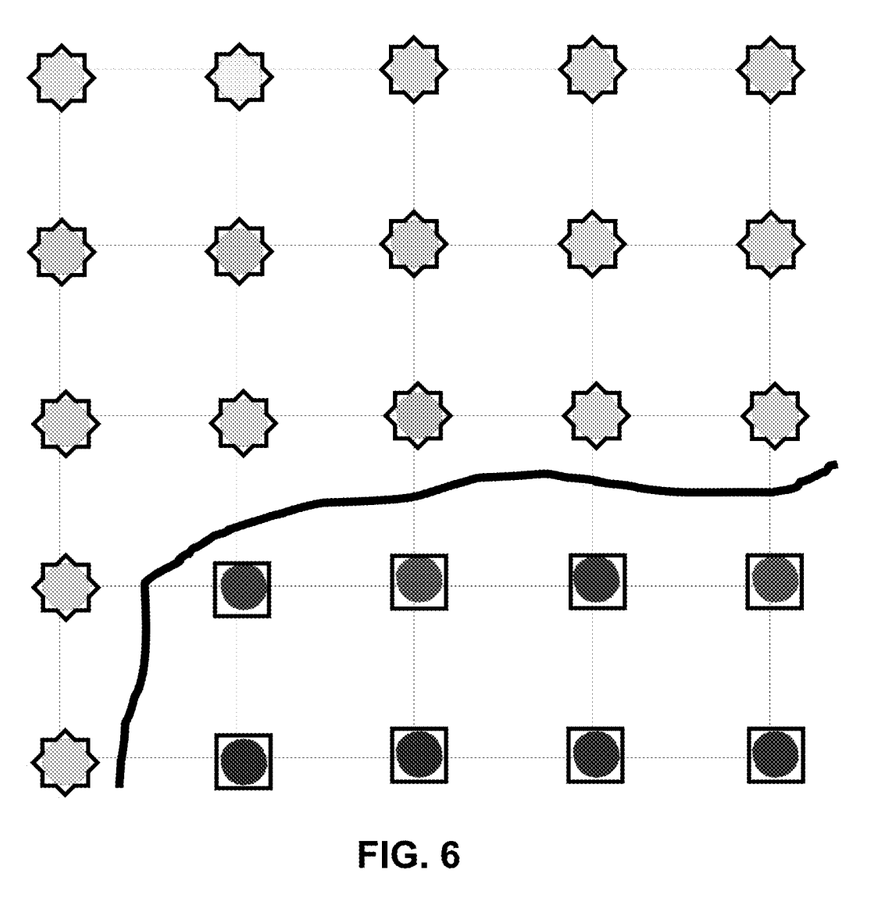
FIG. 6 illustrates an example of assigning labels to individual vertices of a two-dimensional feature space.

$\theta_v(v, \alpha_v) = (1 - \alpha_v) \cdot S_{FG}(v) + \alpha_v \cdot S_{BG}(v),$ $\theta_{uv}(u, \alpha_u, v, \alpha_v) = g(u, v) \cdot S_\#(u) \cdot S_\#(v) \cdot [\alpha_u \neq \alpha_v],$ and $g(u, v) = e^{-\frac{1}{2}(u-v)^T \Sigma^{-1} (u-v)}$ For example, FIG. 6 illustrates an example of assigning labels to individual vertices of a two-dimensional feature space with accumulated values (as shown in FIG. 5). Vertices in the first three rows and the first column of the two-dimensional feature space may be labeled as foreground object (indicated by star). The other vertices in the two-dimensional feature space may be labeled as background object (indicated by square).

Figure 7:
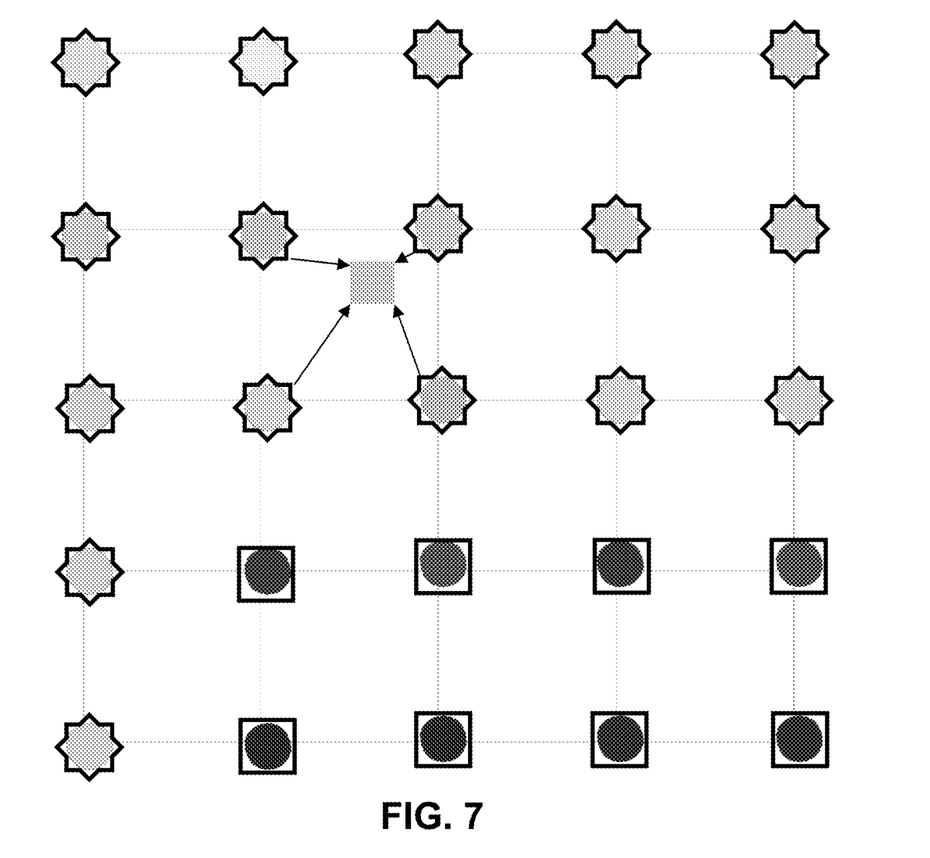
FIG. 7 illustrates an example of interpolating labels of individual vertices at positions of pixels corresponding to the individual vertices.
Figure 8:
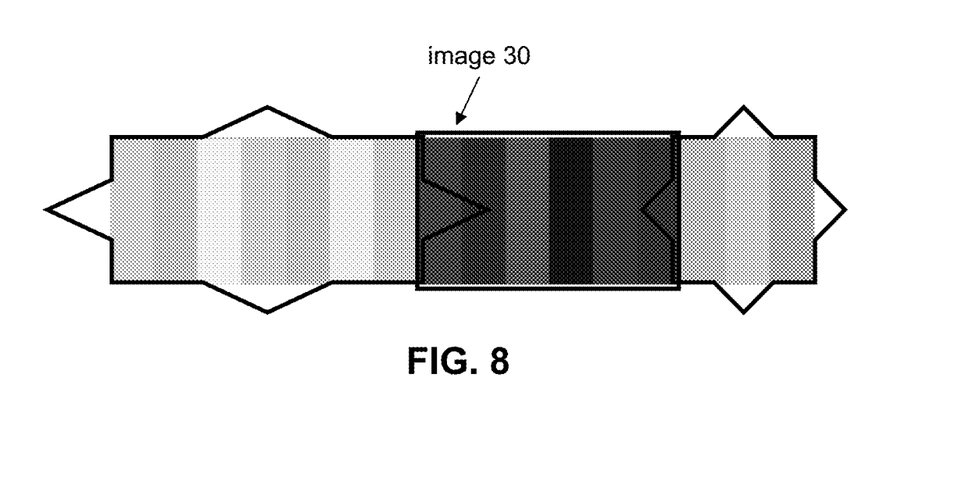
FIG. 8 illustrates an example of a segmented one-dimensional image.

Correlation component 25 may be configured to correlate the association with the visual information represented in the display space. Correlation may define a location of the object in the image. Correlation of the association with the visual information represented in the display space may include interpolating the labels of the individual vertices at the positions of the pixels corresponding to the individual vertices. For example, FIG. 7 illustrates an example of interpolating labels of individual vertices (as shown in FIG. 6) at positions of pixels corresponding to the individual vertices. FIG. 8 illustrates segmentation of image 30 into foreground object (indicated by star) and background object (indicated by a rectangle) based on the interpolation of labels (as shown in FIG. 7).

Interpolation for correlating the association with the visual information may be the same as or different from the interpolation for determining the values on the vertices of the regular grid based on the pixels (described above). For example, determination of the values on the vertices of the regular grid based on the pixels may include a first interpolation, and the correlation of the association with the visual information represented in the display space may include a second interpolation, where the first interpolation may differ from the second interpolation.

Although processor 11 and electronic storage 12 are shown to be connected to a bus 13 in FIG. 1, any communication medium may be used to facilitate interaction between any components of system 10. One or more components of system 10 may communicate with each other through hard-wired communication, wireless communication, or both. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of obtain component 21, designation component 22, representation component 23, association component 24, correlation component 25, and/or other components by software; hardware; firmware; some combination of software, hardware, and/or firmware; and/or other mechanisms for configuring processing capabilities on processor 11.

It should be appreciated that although obtain component 21, designation component 22, representation component 23, association component 24, and correlation component 25 are illustrated in FIG. 1 as being co-located within a single processing unit, in implementations in which processor 11 comprises multiple processing units, one or more of obtain component 21, designation component 22, representation component 23, association component 24, and/or correlation component 25 may be located remotely from the other computer program components.

The description of the functionality provided by the different computer program components 21, 22, 23, 24, and/or 25 described herein is for illustrative purposes, and is not intended to be limiting, as any of computer program components 20, 21, 22, 23, 24, and/or 25 may provide more or less functionality than is described. For example, one or more of computer program components 20, 21, 22, 23, 24, and/or 25 may be eliminated, and some or all of its functionality may be provided by other computer program components 20, 21, 22, 23, 24, and/or 25. As another example, processor 11 may be configured to execute one or more additional computer program components that may perform some or all of the functionality attributed to one or more of computer program components 20, 21, 22, 23, 24, and/or 25.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
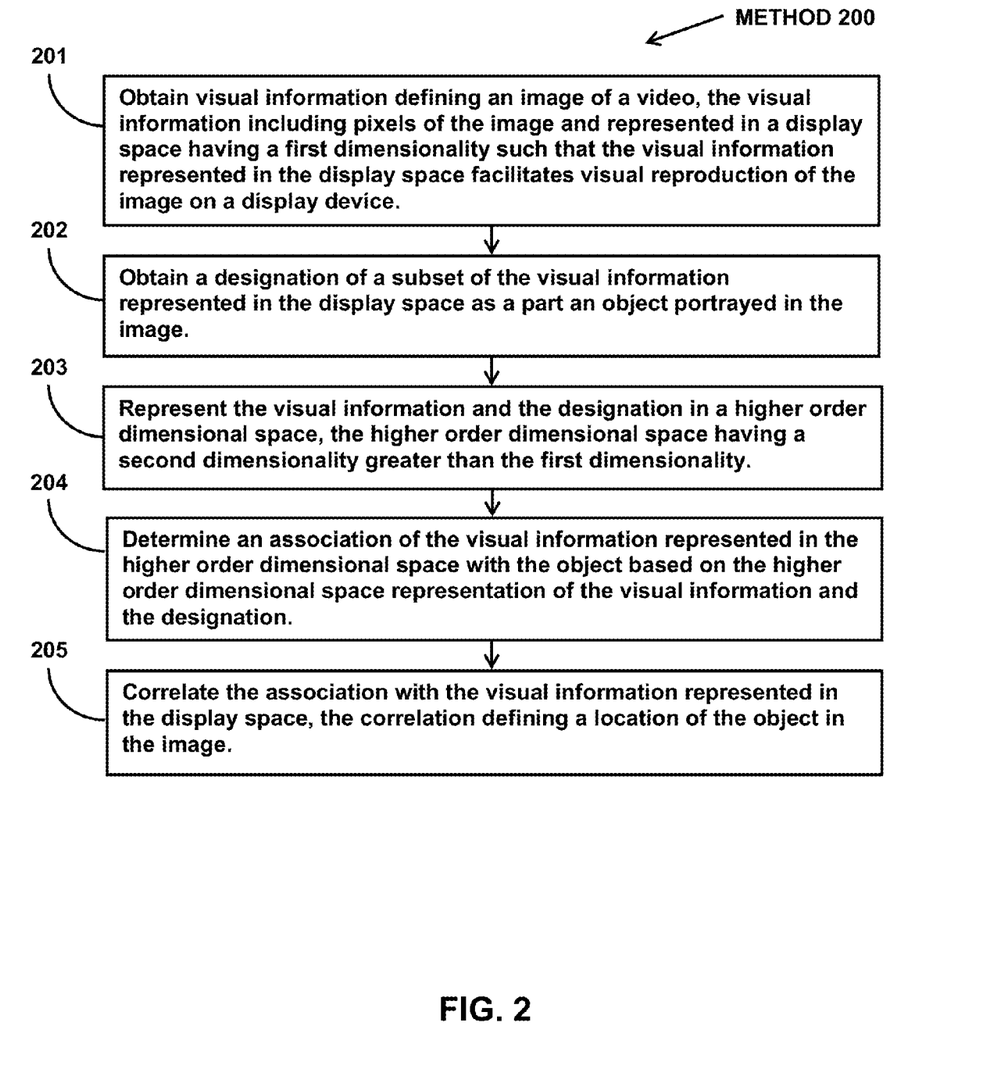
FIG. 2 illustrates a method for segmenting a video in a higher order dimensional space.

FIG. 2 illustrates method 200 for segmenting a video in a higher order dimensional space. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information defining an image of a video may be obtained. The visual information may include pixels of the image. The visual information may be represented in a display having a first dimensionality such that the visual information represented in the display space facilitates visual reproduction of the image on a display device. In some implementations, operation 201 may be performed by a processor component the same as or similar to obtain component 21 (shown in FIG. 1 and described herein).

At operation 202, a designation of a subset of the visual information represented in the display space as a part an object may be obtained. The object may be portrayed in the image. In some implementations, operation 202 may be performed by a processor component the same as or similar to designation component 22 (shown in FIG. 1 and described herein).

At operation 203, the visual information and the designation may be represented in a higher order dimensional space. The higher order dimensional space may have a second dimensionality greater than the first dimensionality. In some implementations, operation 203 may be performed by a processor component the same as or similar to representation component 23 (shown in FIG. 1 and described herein).

At operation 204, an association of the visual information represented in the higher order dimensional space with the object may be determined based on the higher order dimensional space representation of the visual information and the designation. In some implementations, operation 204 may be performed by a processor component the same as or similar to association component 24 (shown in FIG. 1 and described herein).

At operation 205, the association may be correlated with the visual information represented in the display space. The correlation may define a location of the object in the image. In some implementations, operation 205 may be performed by a processor component the same as or similar to correlation component 25 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for segmenting a video in a higher order dimensional space, the system comprising:
   one or more processors configured by machine readable instructions to:
      obtain visual information defining an image of the video, wherein the visual information includes pixels of the image and is represented in a display space having a first dimensionality such that the visual information represented in the display space facilitates visual reproduction of the image on a display device;
      obtain a designation of a subset of the visual information represented in the display space as a part of an object portrayed in the image;
      represent the visual information and the designation in the higher order dimensional space, the higher order dimensional space having a second dimensionality greater than the first dimensionality;

determine an association of the visual information represented in the higher order dimensional space with the object based on the higher order dimensional space representation of the visual information and the designation; and correlate the association with the visual information represented in the display space, the correlation defining a location of the object in the image.

2. The system of claim 1, wherein the designation of the subset of the visual information in the display space is obtained based on a user input.

3. The system of claim 2, wherein the user input includes one or more of a mask, a user click and/or a user stroke.

4. The system of claim 1, wherein the designation of the subset of the visual information in the display space is obtained automatically.

5. The system of claim 1, wherein the higher-order dimensional space includes a bilateral space, the bilateral space including a temporal dimension.

6. The system of claim 1, wherein representing the visual information and the designation in the higher order dimensional space includes embedding the pixels in the higher order dimensional space, resampling the higher order dimensional space using a regular grid, and determining values on vertices of the regular grid based on the pixels.

7. The system of claim 6, wherein the determination of the values on the vertices of the regular grid based on the pixels includes an adjacent interpolation.

8. The system of claim 1, wherein the determination of the association of the visual information represented in the higher order dimensional space with the object includes assigning a label to individual vertices of the regular grid, the label indicating an association of the individual vertices with the object.

9. The system of claim 1, wherein the correlation of the association with the visual information represented in the display space includes interpolating the labels of the individual vertices at the positions of the pixels corresponding to the individual vertices.

10. The system of claim 1, wherein the determination of the values on the vertices of the regular grid based on the pixels includes a first interpolation and the correlation of the association with the visual information represented in the display space includes a second interpolation, the first interpolation differing from the second interpolation.

11. A method for segmenting a video in a higher order dimensional space, the method comprising:

obtaining visual information defining an image of the video, wherein the visual information includes pixels of the image and is represented in a display space having a first dimensionality such that the visual information represented in the display space facilitates visual reproduction of the image on a display device;

obtaining a designation of a subset of the visual information represented in the display space as a part of an object portrayed in the image;

representing the visual information and the designation in the higher order dimensional space, the higher order dimensional space having a second dimensionality greater than the first dimensionality;

determining an association of the visual information represented in the higher order dimensional space with the object based on the higher order dimensional space representation of the visual information and the designation; and correlating the association with the visual information represented in the display space, the correlation defining a location of the object in the image.

12. The method of claim 11, wherein the designation of the subset of the visual information in the display space is obtained based on a user input.

13. The method of claim 12, wherein the user input includes one or more of a mask, a user click and/or a user stroke.

14. The method of claim 11, wherein the designation of the subset of the visual information in the display space is obtained automatically.

15. The method of claim 11, wherein the higher-order dimensional space includes a bilateral space, the bilateral space including a temporal dimension.

16. The method of claim 11, wherein representing the visual information and the designation in the higher order dimensional space includes embedding the pixels in the higher order dimensional space, resampling the higher order dimensional space using a regular grid, and determining values on vertices of the regular grid based on the pixels.

17. The method of claim 16, wherein the determination of the values on the vertices of the regular grid based on the pixels includes an adjacent interpolation.

18. The method of claim 11, wherein the determination of the association of the visual information represented in the higher order dimensional space with the object includes assigning a label to individual vertices of the regular grid, the label indicating an association of the individual vertices with the object.

19. The method of claim 11, wherein the correlation of the association with the visual information represented in the display space includes interpolating the labels of the individual vertices at the positions of the pixels corresponding to the individual vertices.

20. The method of claim 11, wherein the determination of the values on the vertices of the regular grid based on the pixels includes a first interpolation and the correlation of the association with the visual information represented in the display space includes a second interpolation, the first interpolation differing from the second interpolation.

* * * * *